(12) United States Patent
Ruetsch

(10) Patent No.: US 7,610,323 B2
(45) Date of Patent: Oct. 27, 2009

(54) METHOD AND APPARATUS FOR INITIALIZING INTERVAL COMPUTATIONS THROUGH SUBDOMAIN SAMPLING

(75) Inventor: Gregory R. Ruetsch, West Linn, OR (US)

(73) Assignee: Sun Microsystems, Inc., Santa Clara, CA (US)

( * ) Notice: Subject to any disclaimer, the term of this patent is extended or adjusted under 35 U.S.C. 154(b) by 837 days.

(21) Appl. No.: 11/325,214

(22) Filed: Jan. 3, 2006

(65) Prior Publication Data

US 2007/0156802 A1   Jul. 5, 2007

(51) Int. Cl.
*G06F 1/02* (2006.01)
*G06F 7/38* (2006.01)

(52) U.S. Cl. ....................... 708/270; 708/446
(58) Field of Classification Search ................. 708/270, 708/490, 446
See application file for complete search history.

(56) References Cited

U.S. PATENT DOCUMENTS 6,924,802 B2 * 8/2005 Fossum et al. ............ 345/440
7,047,156 B1 * 5/2006 Bechtel et al. ............ 702/179
2003/0125936 A1 * 7/2003 Dworzak ................... 704/211

\* cited by examiner

*Primary Examiner*—Tan V Mai
(74) *Attorney, Agent, or Firm*—Park, Vaughn & Fleming LLP

(57) ABSTRACT

One embodiment of the present invention provides a system that uses a computer to evaluate a function within a domain using an interval computing technique. During operation, the system receives the function and the domain over which the function is to be evaluated. Next, the system creates a set of sampling subdomains within the domain by generating a set of boxes of different sizes which are located at different positions across the domain. The system then performs evaluations on the set of sampling subdomains to generate evaluation results. Next, the system sorts the evaluation results based on box size. The system then selects a box size from the different box sizes by identifying a largest box size which achieves tight bounds on the evaluation results. The system next discretizes the domain into subdomains of the selected box size. Finally, the system uses the interval computing technique to evaluate the function on each of the subdomains wherein the interval computing technique recursively subdivides and evaluates the function on the subdomains.

21 Claims, 4 Drawing Sheets

$X \equiv [\underline{x}, \bar{x}] \equiv \{x \in \Re^* | \underline{x} \leq x \leq \bar{x}\}$ $Y \equiv [\underline{y}, \bar{y}] \equiv \{y \in \Re^* | \underline{y} \leq y \leq \bar{y}\}$ (1) $X+Y = [\downarrow \underline{x}+\underline{y}, \uparrow \bar{x}+\bar{y}]$ (2) $X-Y = [\downarrow \underline{x}-\bar{y}, \uparrow \bar{x}-\underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})], \text{ if } 0 \notin Y$ $X/Y \subseteq \Re^*, \text{ if } 0 \in Y$

FIG. 4

METHOD AND APPARATUS FOR INITIALIZING INTERVAL COMPUTATIONS THROUGH SUBDOMAIN SAMPLING

BACKGROUND

1. Field of the Invention

The present invention relates to techniques for performing interval computations within computer systems. More specifically, the present invention relates to a method and an apparatus for initializing interval computations through subdomain sampling within computer systems.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most numerical computations.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval computation represents a new paradigm in the computing technology, which has been developed to solve the above-described problems. Specifically, interval computation represents numbers as intervals specified by a first (left) endpoint and a second (right) endpoint. For example, the interval [a,b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers. Also note that the infimum and the supremum can be represented by floating-point numbers.)

Typically, interval methods solve function evaluation problems (e.g., optimization, rooting finding, etc.) using a "branch-and-prune" technique. This technique begins by dividing the domain of interest into a number of larger subdomains. Next, a variety of interval techniques are used to eliminate subdomains which can be proven to contain no solutions. The remaining subdomains are then subdivided into smaller subdomains and the process repeats recursively until user-specified tolerances of interval widths are met on all remaining subdomain boxes (which contain solutions). This technique is guaranteed to produce bounds which contain the solutions to the problems.

Unfortunately, the branch-and-prune technique has some drawbacks. In particular, we note that the efficiency of the interval computation depends on the ability of these interval techniques to delete or contract subdomain boxes. However, a particular interval technique typically becomes effective only when the domain of interest has been sufficiently subdivided into smaller boxes, wherein the interval technique starts to generate "tight bounds" which contain solutions. In other words, at larger subdomain scales during the branch-and-prune process, the interval technique may not generate any useful information on the subdomains being evaluated to eliminate or contract those subdomains. Consequently, the associated computations simply consume computation resources.

Furthermore, performing branch-and-prune function evaluations on those large subdomain boxes which do not contain solutions can be extremely time-consuming, because the interval techniques perform exhaustive searches for solutions until an entire subdomain space has been examined.

Note that the above-described problems are inherent to interval computations which can significantly degrade efficiency during the function evaluation process.

Hence what is needed is method and apparatus that facilitates more efficient interval function evaluations without the above-described problems.

SUMMARY

One embodiment of the present invention provides a system that uses a computer to evaluate a function within a domain using an interval computing technique. During operation, the system receives the function and the domain over which the function is to be evaluated. Next, the system creates a set of sampling subdomains within the domain by generating a set of boxes of different sizes which are located at different positions across the domain. The system then performs evaluations on the set of sampling subdomains to generate evaluation results. Next, the system sorts the evaluation results based on box size. The system then selects a box size from the different box sizes by identifying a largest box size which achieves tight bounds on the evaluation results. The system next discretizes the domain into subdomains of the selected box size. Finally, the system uses the interval computing technique to evaluate the function on each of the subdomains wherein the interval computing technique recursively subdivides and evaluates the function on the subdomains.

In a variation of this embodiment, the tight bound is obtained at a box size where subsequent reductions in box size decrease the percentage of boxes that contain a solution by less than a pre-specified amount.

In a variation of this embodiment, the sampling subdomains include large sampling subdomains which do not generate tight bounds on the evaluation results.

In a variation of this embodiment, identifying the largest box size which achieves tight bounds on the evaluation results involves identifying a transition from a sampling subdomain size which does not generate tight bounds on the evaluation results to a next-largest sampling subdomain size which generates tight bounds.

In a variation of this embodiment, performing evaluations on the set of sampling subdomains involves evaluating both the function and derivatives of the function on the set of sampling subdomains.

In a variation of this embodiment, performing evaluations on the set of sampling subdomains further involves using interval techniques, which can include: box consistency; Hull consistency; term consistency; monotonicity; and Newton contraction.

In a further variation, the evaluation results indicate an initial box size on which the interval technique becomes effective in evaluating the function.

BRIEF DESCRIPTION OF THE FIGURES

FIG. 4 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
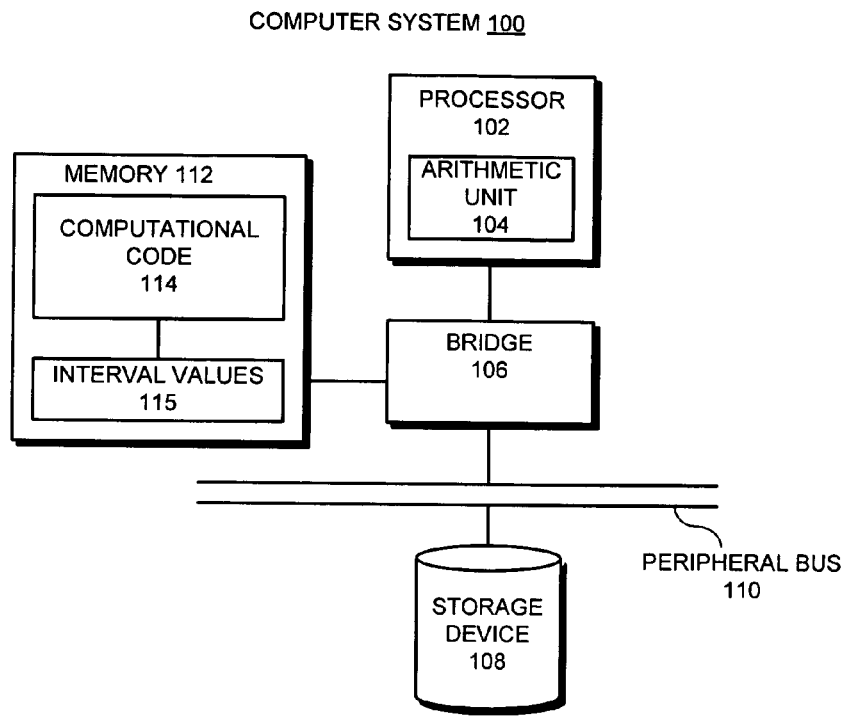
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code 114. Computational code 114 contains instructions for the interval operations to be performed on individual operands, or interval values 115, which are also stored within memory 112. This computational code 114 and these interval values 115 are described in more detail below with reference to FIGS. 2-4.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
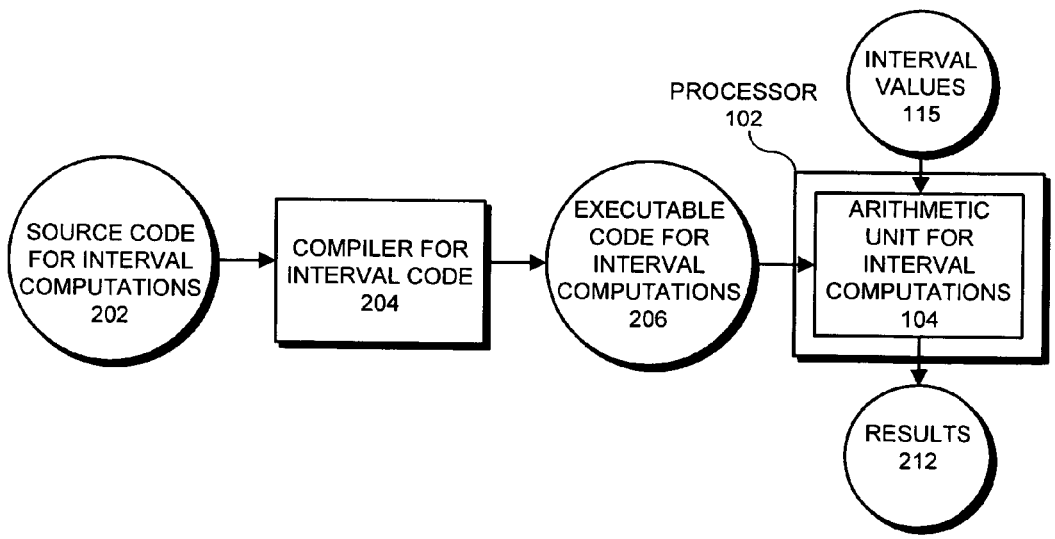
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
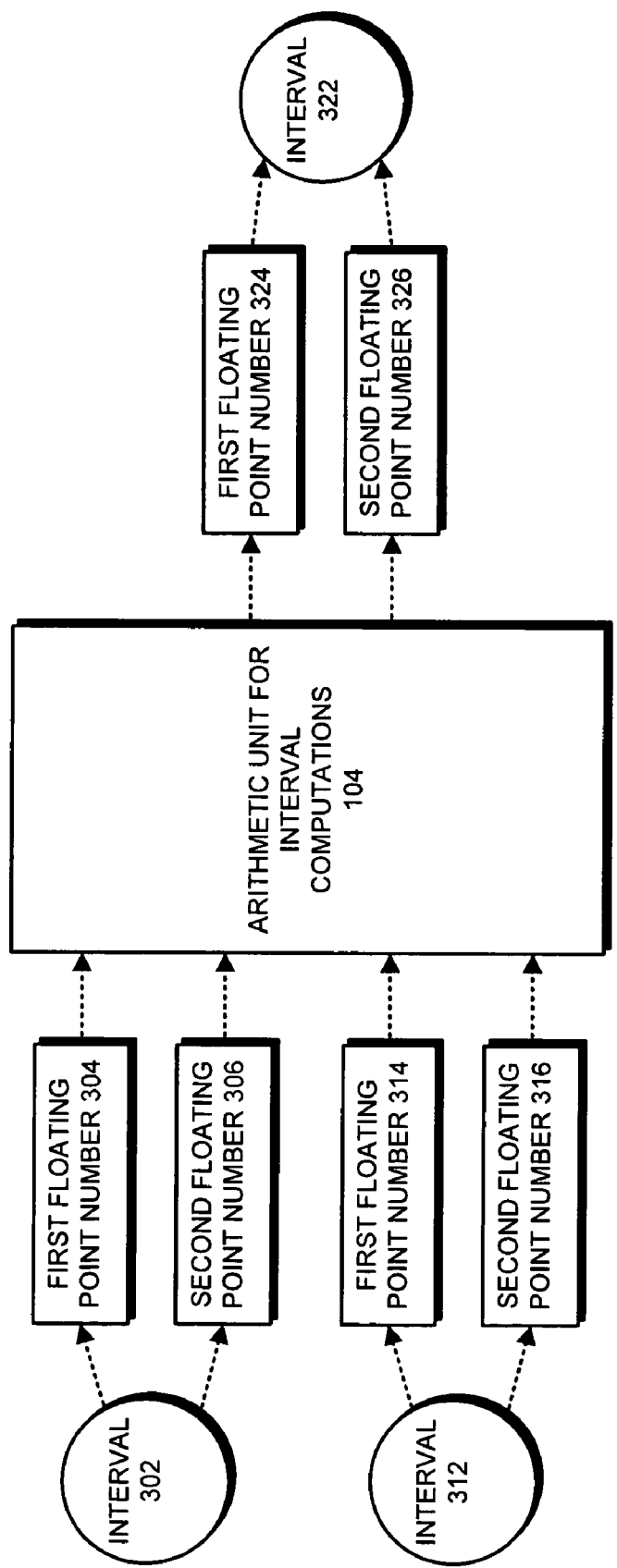
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 4. This circuitry enables the interval operations to be performed efficiently.

However, note that the present invention can also be applied to computing devices that do not include special-purpose hardware for performing interval operations. In such computing devices, compiler 204 converts interval operations into an executable code that can be executed using standard computational hardware that is not specially designed for interval operations.

Interval Operations

Interval computations facilitate controlling round-off errors in floating point computations. Specifically, instead of using a single floating-point value to represent a number, which may cause an error if the number is not machine-representable, the number is represented by an upper bound and a lower bound that are both machine-representable. During operation, interval computation uses directed or outward rounding such that the resulting interval always contains the mathematical result.

FIG. 4 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended system of real numbers R* (see line 1 of FIG. 4). Similarly the interval Y also has two endpoints and is a closed subset of the extended real numbers R* (see line 2 of FIG. 4).

In the equations that appear in FIG. 4, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note that, in one embodiment of the present invention, extended interval operations never cause undefined outcomes, which are referred to as "exceptions" in the IEEE 754 standard.

Function Evaluation

In addition to basic arithmetic operations, a system that performs interval computations can evaluate interval functions. Generally, if we have a function $f(x)$, then the analytic function evaluation on an interval X is:

$$f(X)=\{f(x)|x \in X\}.$$

During an interval computation operation, an interval function evaluation denoted as "F(X)" is used. Note that F(X) has the same expression as $f(x)$, except that F(X) operates on the intervals directly rather than through the $f(x)$ relation. A consequence of the fundamental theorem of interval mathematics which relates $f(X)$ and F(X) is that all the points in $f(X)$ are contained in F(X), that is:

$$f(X) \subset F(X).$$

Note that by simply performing a function evaluation by replacing a point-based evaluation in the expression with an interval-based evaluation, one obtains bounds for the function over the entire interval X.

As an example, we consider a function $$f(x) = \frac{x}{x+1},$$

and an interval X=[1,3]. We get $$f([1, 3]) = \{x/(x+1)|x \in [1, 3]\} = [1/2, 3/4],$$

and $$F([1, 3]) = \frac{[1, 3]}{[1, 3]+1} = [1/4, 3/2].$$

In the last expression, the dependency between the two occurrences of X in F(X) is lost, resulting in a broader interval than that of $f(X)$. However, if we rewrite the $f(x)$ expression as:

$$g(x) = \frac{1}{1+1/x},$$

then the dependency issue is removed, and we obtain G(X) =$f(X)$. Note that for a degenerate interval, i.e. an interval where $\underline{x}=\overline{x}$, then all forms return to the same (degenerate) interval:

$$G([1,1])=F([1,1])=f([1,1])=[½,½].$$

Note that although the above example describes a function in a one-dimensional interval, the function evaluation in interval computation is generally applicable to two-dimensional or multi-dimensional domains.

Interval Function Evaluation through Subdomain Sampling

Figure 5:
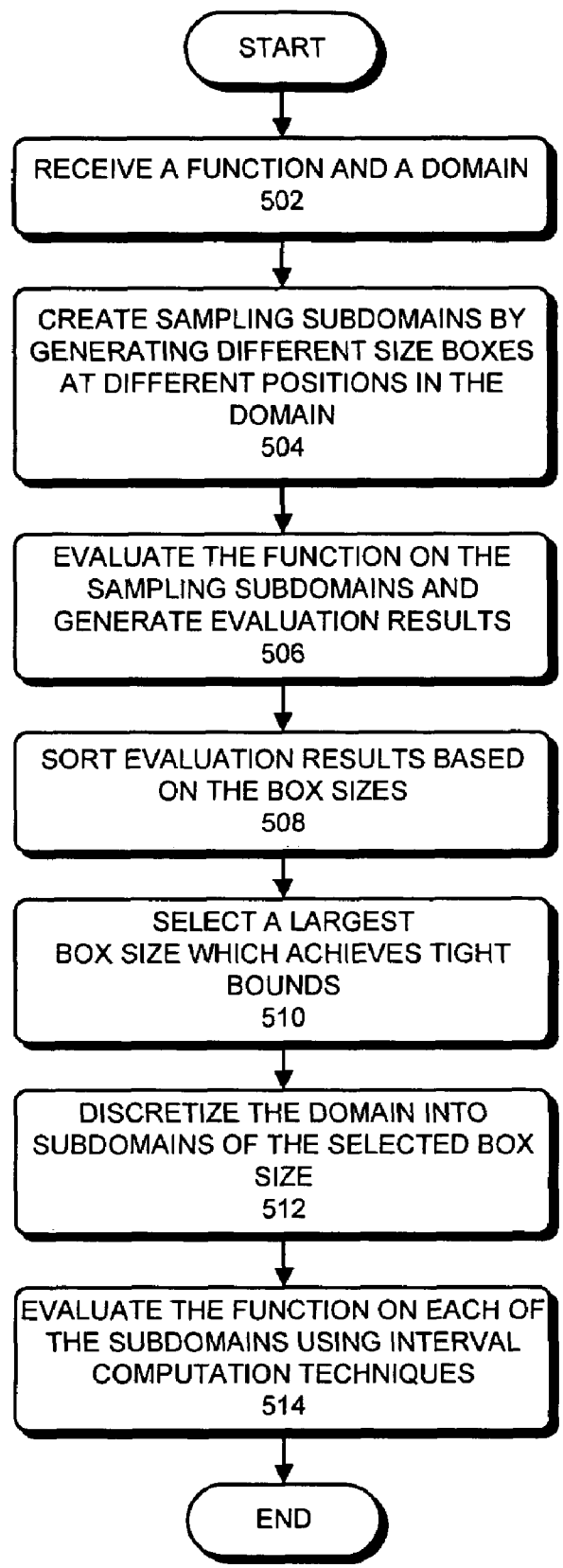
FIG. 5 presents a flowchart illustrating the process of evaluating a function within a domain using the subdomain sampling technique in accordance with an embodiment of the present invention.

FIG. 5 presents a flowchart illustrating the process of evaluating a function within a domain using the subdomain sampling technique in accordance with an embodiment of the present invention.

The process starts by receiving the function and the domain over which the function is to be evaluated (step 502). Note that the domain of interest can be a one-dimensional interval or a multi-dimensional space.

Next, the process creates a set of sampling subdomains within the domain by generating a set of boxes of different sizes which are located at different positions across the domain (step 504). Specifically, the set of boxes include a range of discrete sizes that sufficiently represent different scales of the domain decomposition. Note that a number of samples will be generated for each of the box sizes. The set of sampling subdomains is then randomly placed at different locations within the domain. It is preferable to distribute the subdomains to cover the entire domain, thereby ensuring that no particular subsection of the domain is left without any or sufficient sampling subdomains of any box size.

Next, the process performs evaluations on the set of sampling subdomains to generate evaluation results (step 506). In particular, evaluating the set of sampling subdomains involves evaluating both the function and derivatives of the function. Some of the common interval techniques that can be used for function evaluation include: box and Hull consistency, term consistency, monotonicity, and Newton contraction. However, other interval techniques may also apply. Each of these interval techniques is capable of eliminating or contracting the subdomains through function evaluation. Note that how well a particular interval technique can eliminate or contract subdomains depends on the sizes of the subdomains. Consequently, the evaluation result from a particular interval technique can be used as an indicator which indicates at approximately what subdomain size that interval technique becomes effective for a given function evaluation problem.

The evaluation results are then sorted based on different box sizes, for example, from the largest box size to the smallest box size (step 508). The evaluation results obtained on each box size are investigated. Next, the process selects a box size from these box sizes by identifying a largest box size which achieves tight bounds on the evaluation results (step 510).

In order to ensure that such a box size exists, the sizes of sampling subdomains should include sufficiently large box sizes which do not generate the tight bounds on the evaluation results. As a result, identifying the largest box size which achieves tight bounds involves identifying a specific box size from the set of box sizes based on a transition of the evaluation results. More specifically, we identify a transition from a box size which does not generate the tight bounds on the evaluation results to a next-largest box size which just begins to produce tight bounds. This next-largest box size is selected accordingly.

In one embodiment of the present invention, a "transition" can be defined to occur when a reduction in box size results in a decrease in a percentage of boxes of that size that contain a solution by more than a pre-specified percentage value. Note that, the transition may occur at different box sizes for different interval techniques. Hence, the transition also indicates at what subdomain scale a particular interval technique becomes effective.

Next, the process discretizes the domain evenly into subdomains of the selected box size (step 512). Once the domain has been decomposed into that box size, the process can uses a conventional interval computing technique to evaluate the function on each of the subdomains wherein the interval computing technique recursively subdivides and evaluates the function on each of the subdomains to obtain solutions (step 514).

Example of Applying Subdomain Sampling

The example we choose to illustrate the subdomain sampling technique is an optimization problem. Suppose we have a function $f(x, y)$ of two independent variables x and y. Furthermore, let's assume the domain of interest is $(x,y)=([0, 1], [0,1])$. The problem statement is then to find the minimum value off $f$ in the domain of interest $(x,y)=([0,1], [0,1])$, denoted as $f_{min}$, along with the location(s) in the domain space at which the minimum occurs, denoted as $(X_{min}, Y_{min})$.

For the above optimization problem, some of the interval techniques can be used to eliminate subdomains are:

$f_{lub}$ test: Whenever $f$ is evaluated over a subdomain, if the lower bound is greater than the least upper bound of all previous evaluations, denoted as $f_{lub}$, the subdomain can not contain the minimum and can be deleted.

Monotonicity: At a minimum, each component of the gradient of $f$ must be zero. For a subdomain to contain a minimum, the interval bounds for each component of the gradient must include zero. If any component of the gradient can be bounded away from zero then the subdomain can be deleted.

Interval Newton: The interval Newton method is used to find zeros of the function gradient, which uses the gradient and Hessian of $f$. The method can result in elimination, contraction, or splitting of the subdomain, or it may not provide any useful information on the subdomain.

In addition to the above list, there are also box and hull consistency, Hessian tests, and other component techniques that are used in interval optimization. A detailed list can be found in "Global Optimization Using Interval Analysis," by E. R. Hansen and G. W. Walster, Second Edition, Revised and Expanded, Marcel Decker, 2004. Note that each of these interval techniques shares a common feature that typically an evaluation of the function or its derivatives over the subdomain are needed. In addition, the effectiveness of these interval techniques largely depends on the sizes of the subdomains of these evaluations.

Using the three listed optimization techniques, one needs to know when the function, the gradient of the function, and the Hessian evaluations over subdomains become sufficiently "tight" to be useful. One embodiment of the present invention samples the domain of interest with different size subdomains and evaluates the function and its derivatives over these sampling subdomains. For the domain of interest $(x,y)=([0,1], [0,1])$, one can choose square sample subdomain sizes ranging from 0.1 to $10^{-12}$ on a side. It is not necessary to have a continuous range of sizes, a few samples in each order of magnitude are typically sufficient to obtain the desired information of the domain.

In an extreme case, if all the function and derivative evaluation results in interval bounds of $[-1, +1]$, then one can assess that, for the forms of the functions and derivatives used in the evaluation, the problem is intractable. The population of boxes would need to be at least on the order of $10^{12}$ before any boxes can be removed, and even then we have no evidence that further subdivision would help.

In another scenario during the subdomain sampling, one may observe that at certain subdomain scale (say subdomain size of $10^{-3}$ on a side and smaller) that the gradient evaluations generate a sufficiently small width, and that a fair number of these subdomain samples are bounded from zero. This indicates that the monotonicity technique is likely to be effective at eliminating boxes at this length scale, and the problem is tractable. In such a case, it can be more efficient to simply subdivide the initial domain of interest into a grid of subdomains of $10^{-3}$ length scale, instead of initializing the domain of interest with a single subdomain and then performing evaluations and splitting the box until the $10^{-3}$ length-scale is reached.

Conclusion

The above-described subdomain sampling technique determines an initial subdomain box size for interval function evaluation problems, which is based on when the interval techniques become effective. In contrast, the conventional branch-and-prune technique is a heuristic approach that starts with a largest possible subdomain box size. Hence, the present invention facilitates a more efficient function evaluation process by eliminating unnecessary computations on larger subdomains which do not generated useful results.

Furthermore, acquiring some basic information a priori through the subdomain sampling increases efficiency of the function evaluation process. This is because, in addition to determining the initial subdomain size, the evaluation results can be used to determine when a certain interval technique becomes effective and can be commenced.

If one considers the process of subdividing the domain of interest during a interval computation as a box undergoes splitting in a tree-based structure down to a certain length scale, then the present invention can be viewed as a way to eliminate the cost of evaluations performed at all of the branch nodes and only perform evaluations on the leaf nodes.

Note that although the above example demonstrates how the subdomain sampling can be used in the context of an optimization problem, the subdomain sampling is not restricted to this class of problems. Any problem where the interval computation involves a branch-and-prune technique can benefit from this type of a priori subdomain sampling.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a computer system to evaluate a function within a domain using an interval computing technique, the method comprising:
   receiving the function and the domain over which the function is to be evaluated;
   creating a set of sampling subdomains within the domain by generating a set of boxes of different sizes which are located at different positions across the domain;
   performing evaluations on the set of sampling subdomains to generate evaluation results;
   sorting the evaluation results based on box size;
   selecting a box size from the different box sizes by identifying a largest box size which achieves tight bounds on the evaluation results;
   discretizing the domain into subdomains of the selected box size; and
   using the interval computing technique to evaluate the function on each of the subdomains wherein the interval computing technique recursively subdivides and evaluates the function on the subdomains.

2. The method of claim 1, wherein the tight bound is obtained at a box size where subsequent reductions in box size decrease the percentage of boxes that contain a solution by less than a pre-specified amount.

3. The method of claim 1, wherein the sampling subdomains include large sampling subdomains which do not generate tight bounds on the evaluation results.

4. The method of claim 1, wherein identifying the largest box size which achieves tight bounds on the evaluation results involves identifying a transition from a sampling subdomain size which does not generate tight bounds on the evaluation results to a next-largest sampling subdomain size which generates tight bounds.

5. The method of claim 1, wherein performing evaluations on the set of sampling subdomains involves:
   evaluating the function on the set of sampling subdomains; and
   evaluating derivatives of the function on the set of sampling subdomains.

6. The method of claim 1, wherein performing evaluations on the set of sampling subdomains further involves using interval techniques, which can include:
   box consistency;
   Hull consistency;
   term consistency;
   monotonicity; and
   Newton contraction.

7. The method of claim 6, wherein the evaluation results indicate an initial box size on which a specific interval technique becomes effective for function evaluation.

8. A computer-readable storage medium storing instructions that when executed by a computer system cause the computer system to use a computer system to evaluate a function within a domain using an interval computing technique, the method comprising:
   receiving the function and the domain over which the function is to be evaluated;
   creating a set of sampling subdomains within the domain by generating a set of boxes of different sizes which are located at different positions across the domain;
   performing evaluations on the set of sampling subdomains to generate evaluation results;
   sorting the evaluation results based on box size;
   selecting a box size from the different box sizes by identifying a largest box size which achieves tight bounds on the evaluation results;
   discretizing the domain into subdomains of the selected box size; and
   using the interval computing technique to evaluate the function on each of the subdomains wherein the interval computing technique recursively subdivides and evaluates the function on the subdomains.

9. The computer-readable storage medium of claim 8, wherein the tight bound is obtained at a box size where subsequent reductions in box size decrease the percentage of boxes that contain a solution by less than a pre-specified amount.

10. The computer-readable storage medium of claim 8, wherein the sampling subdomains include large sampling subdomains which do not generate tight bounds on the evaluation results.

11. The computer-readable storage medium of claim 8, wherein identifying the largest box size which achieves tight bounds on the evaluation results involves identifying a transition from a sampling subdomain size which does not generate tight bounds on the evaluation results to a next-largest sampling subdomain size which generates tight bounds.

12. The computer-readable storage medium of claim 8, wherein performing evaluations on the set of sampling subdomains involves:
- evaluating the function on the set of sampling subdomains; and
- evaluating derivatives of the function on the set of sampling subdomains.

13. The computer-readable storage medium of claim 8, wherein performing evaluations on the set of sampling subdomains further involves using interval techniques, which can include:
- box consistency;
- Hull consistency;
- term consistency;
- monotonicity; and
- Newton contraction.

14. The computer-readable storage medium of claim 13, wherein the evaluation results indicate an initial box size on which a specific interval technique becomes effective for function evaluation.

15. An apparatus that uses a computer system to evaluate a function within a domain using an interval computing technique, the apparatus comprising:
- a receiving mechanism configured to receive the function and the domain over which the function is to be evaluated;
- a memory for storing the function and the domain;
- a generation mechanism configured to create a set of sampling subdomains within the domain by generating a set of boxes of different sizes which are located at different positions across the domain;
- an evaluation mechanism configured to perform evaluations on the set of sampling subdomains to generate evaluation results;
- a sorting mechanism configured to sort the evaluation results based on box size;
- a selection mechanism configured to select a box size from the different box sizes by identifying a largest box size which achieves tight bounds on the evaluation results;
- a discretization mechanism configured to discretize the domain into subdomains of the selected box size; and
- an evaluation mechanism configured to use the interval computing technique to evaluate the function on each of the subdomains by recursively subdividing and evaluating the function on the subdomains.

16. The apparatus of claim 15, wherein the tight bound is obtained at a box size where subsequent reductions in box size decrease the percentage of boxes that contain a solution by less than a pre-specified amount.

17. The apparatus of claim 15, wherein the sampling subdomains include large sampling subdomains which do not generate tight bounds on the evaluation results.

18. The apparatus of claim 15, wherein identifying the largest box size which achieves tight bounds on the evaluation results involves identifying a transition from a sampling subdomain size which does not generate tight bounds on the evaluation results to a next-largest sampling subdomain size which generates tight bounds.

19. The apparatus of claim 15, wherein performing evaluations on the set of sampling subdomains involves:
- evaluating the function on the set of sampling subdomains; and
- evaluating derivatives of the function on the set of sampling subdomains.

20. The apparatus of claim 15, wherein performing evaluations on the set of sampling subdomains further involves using interval techniques, which can include:
- box consistency;
- Hull consistency;
- term consistency;
- monotonicity; and
- Newton contraction.

21. The apparatus of claim 20, wherein the evaluation results on the sampling subdomains indicate an initial box size on which a specific interval technique becomes effective for function evaluation.

* * * * *

UNITED STATES PATENT AND TRADEMARK OFFICE
CERTIFICATE OF CORRECTION

| | |
|---|---|
| PATENT NO. | : 7,610,323 B2 |
| APPLICATION NO. | : 11/325214 |
| DATED | : October 27, 2009 |
| INVENTOR(S) | : Gregory R. Ruetsch |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this

Twelfth Day of October, 2010

David J. Kappos
*Director of the United States Patent and Trademark Office*